US012483945B2

(12) United States Patent
Dalsgaard et al.

(10) Patent No.: US 12,483,945 B2
(45) Date of Patent: Nov. 25, 2025

(54) METHOD, APPARATUS AND COMPUTER PROGRAM

(71) Applicant: NOKIA TECHNOLOGIES OY, Espoo (FI)

(72) Inventors: Lars Dalsgaard, Oulu (FI); Jani-Pekka Kainulainen, Cambridge (GB); Riikka Karoliina Dimnik, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/072,379

(22) Filed: Mar. 6, 2025

(65) Prior Publication Data
US 2025/0203472 A1 Jun. 19, 2025

Related U.S. Application Data

(63) Continuation of application No. 18/888,296, filed on Sep. 18, 2024.

(30) Foreign Application Priority Data

Sep. 27, 2023 (GB) ...................... 2314828

(51) Int. Cl.
H04W 4/00 (2018.01)
H04W 36/00 (2009.01)
(52) U.S. Cl.
CPC .............. H04W 36/0072 (2013.01)
(58) Field of Classification Search
CPC ............................... H04W 36/0072
(Continued)

(56) References Cited

U.S. PATENT DOCUMENTS 10,912,144 B2  2/2021  Chen et al.
2019/0364492 A1* 11/2019 Azizi .............. H04L 67/12
(Continued)

FOREIGN PATENT DOCUMENTS

CN    102821482 B    5/2017
WO    2023/108564 A1  6/2023
(Continued)

OTHER PUBLICATIONS

"3rd Generation Partnership Project; Technical Specification Group Radio Access Network; NR; Radio Resource Control (RRC) protocol specification (Release 17)," 3GPP TS 38.331, V17.5.0, Jun. 2023, pp. 1-1328. No copy provided, per MPEP 609. Copy submitted in parent U.S. Appl. No. 18/888,296.

(Continued)

Primary Examiner — Chuong T Ho
(74) Attorney, Agent, or Firm — SQUIRE PATTON BOGGS (US) LLP

(57) ABSTRACT

There is provided an apparatus comprising: means for receiving, on a source cell, a radio resource control configuration for at least one candidate cell including first configuration information and second configuration information; means for decoding the first configuration information; means for performing the at least one measurement based on the first configuration information; means for transmitting, on the source cell, a measurement report comprising at least one result of the at least one measurement; means for receiving, on the source cell, a message triggering the apparatus to decode the second configuration information; means for decoding the second configuration information; means for receiving, on the source cell, a command to switch the apparatus to a target cell selected amongst the at least one candidate cell; and means for switching to the target cell based on the second configuration information.

18 Claims, 10 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2021/0212091 A1 | 7/2021 | Pezeshki et al. | |
| 2022/0295368 A1 | 9/2022 | Ozturk et al. | |
| 2023/0047370 A1* | 2/2023 | Naganuma | G06F 13/4022 |
| 2023/0247708 A1 | 8/2023 | Xu et al. | |
| 2024/0098610 A1* | 3/2024 | Min | H04W 36/30 |
| 2024/0155449 A1* | 5/2024 | Damnjanovic | H04W 36/008357 |
| 2024/0284283 A1* | 8/2024 | Akl | H04W 36/08 |
| 2024/0323777 A1* | 9/2024 | Agiwal | H04W 36/08 |
| 2024/0381190 A1* | 11/2024 | Bai | H04W 36/0058 |
| 2024/0422631 A1* | 12/2024 | Damnjanovic | H04W 36/08 |
| 2025/0038909 A1* | 1/2025 | Rudolf | H04L 5/0094 |
| 2025/0056348 A1* | 2/2025 | Shih | H04W 74/04 |
| 2025/0088927 A1* | 3/2025 | Agiwal | H04W 36/0069 |
| 2025/0097989 A1* | 3/2025 | Agiwal | H04W 72/231 |

FOREIGN PATENT DOCUMENTS

| | | |
|---|---|---|
| WO | 2023/128726 A1 | 7/2023 |
| WO | 2023/137687 A1 | 7/2023 |
| WO | 2023/141837 A1 | 8/2023 |
| WO | 2023/154797 A1 | 8/2023 |
| WO | 2023/160706 A1 | 8/2023 |
| WO | 2024097854 A1 | 5/2024 |
| WO | 2024/208583 A1 | 10/2024 |

OTHER PUBLICATIONS

"Msc-generator," Sourceforge, Retrieved on Sep. 11, 2024, Webpage available at: https://sourceforge.net/projects/msc-generator/. No copy provided, per MPEP 609. Copy submitted in parent U.S. Appl. No. 18/888,296.
"3rd Generation Partnership Project; Technical Specification Group Radio Access Network; NR; Physical layer procedures for control (Release 17)," 3GPP TS 38.213, V17.6.0, Jun. 2023, pp. 1-262. No copy provided, per MPEP 609. Copy submitted in parent U.S. Appl. No. 18/888,296.
"3rd Generation Partnership Project; Technical Specification Group Radio Access Network; NR; Requirements for support of radio resource management (Release 18)," 3GPP TS 38.133, V18.2.0, Jun. 2023, pp. 82-289. No copy provided, per MPEP 609. Copy submitted in parent U.S. Appl. No. 18/888,296.
"Discussion on RRC configurations of LTM," 3GPP TSG-RAN WG2 Meeting #120, R2-2212654, Agenda: 8.4.2.2, Xiaomi, Nov. 14-18, 2022, 5 pages. No copy provided, per MPEP 609. Copy submitted in parent U.S. Appl. No. 18/888,296.
"FL summary 3 on L1 enhancements for inter-cell beam management," 3GPP TSG RAN WG1 Meeting #112bis-e, R1-2304090, Agenda: 9.10.1, Fujistu, Apr. 17-26, 2023, pp. 1-214. No copy provided, per MPEP 609. Copy submitted in parent U.S. Appl. No. 18/888,296.
Search Report received for corresponding United Kingdom Patent Application No. 2314828.1, dated Mar. 20, 2024, 3 pages. No copy provided, per MPEP 609. Copy submitted in parent U.S. Appl. No. 18/888,296.
Search Report received for corresponding United Kingdom Patent Application No. 2314837.2, dated May 13, 2024, 5 pages. No copy provided, per MPEP 609. Copy submitted in parent U.S. Appl. No. 18/888,296.
"Layer-1 Enhancements for L1/L2-triggered Mobility," 3GPP TSG RAN WG1 #112, R1-2300384, Agenda: 9.12.1, Nokia, Feb. 27-Mar. 3, 2023, 19 pages. No copy provided, per MPEP 609. Copy submitted in parent U.S. Appl. No. 18/888,296.
"Configurations of Candidate Cell for LTM," 3GPP TSG-RAN WG2 Meeting #121bis-e, R2-2302805, Agenda: 7.4.2.2, vivo, Apr. 17-26, 2023, 13 pages. No copy provided, per MPEP 609. Copy submitted in parent U.S. Appl. No. 18/888,296.
"Report of [Post119-e][036][feMob] Time Chart," 3GPP TSG-RAN WG2 Meeting #119-e, R2-2209256, Agenda: 8.4.2.1, MediaTek Inc, Aug. 17-29, 2022, pp. 1-16. No copy provided, per MPEP 609. Copy submitted in parent U.S. Appl. No. 18/888,296.
"Discussion on the early TA acquisition," 3GPP TSG-RAN WG2 Meeting #121, R2-2300408, Agenda: 8.4.2.1, Intel Corporation, Feb. 27-Mar. 3, 2023, 5 pages. No copy provided, per MPEP 609. Copy submitted in parent U.S. Appl. No. 18/888,296.
International Search Report and Written Opinion received for corresponding Patent Cooperation Treaty Application No. PCT/EP2024/071121, dated Dec. 2, 2024, 19 pages. No copy provided, per MPEP 609. Copy submitted in parent U.S. Appl. No. 18/888,296.
"Layer-1 Enhancements for L1/L2-triggered Mobility," 3GPP TSG RAN WG1 #113, R1-2305156, Agenda: 9.10.1, Nokia, May 22-26, 2023, 15 pages. No copy provided, per MPEP 609. Copy submitted in parent U.S. Appl. No. 18/888,296.
"Enhancements on Latency Components for L1/L2-triggered Mobility," 3GPP TSG-RAN WG2 Meeting #120, R2-2211194, Agenda: 8.4.2.1.1, MediaTek Inc, Nov. 14-18, 2022, 5 pages. No copy provided, per MPEP 609. Copy submitted in parent U.S. Appl. No. 18/888,296.
Discussion on LTM cell switch delay requirements, 3GPP TSG-RAN WG4 Meeting #108bis, R4-2315929, Agenda: 8.24.2.3, Nokia, Oct. 9-13, 2023, 10 pages. No copy provided, per MPEP 609. Copy submitted in parent U.S. Appl. No. 18/888,296.
International Search Report and Written Opinion received for corresponding Patent Cooperation Treaty Application No. PCT/FI2024/050484, dated Dec. 17, 2024, 17 pages. No copy provided, per MPEP 609. Copy submitted in parent U.S. Appl. No. 18/888,296.
"Further details on TA Acquisition and Maintenance in LTM," 3GPP TSG-RAN WG2 Meeting #122, R2-2305879, Agenda: 7.4.2.1, Nokia, May 22-26, 2023, 8 pages. No copy provided, per MPEP 609. Copy submitted in parent U.S. Appl. No. 18/888,296.
"Discussion on procedures for LTM," 3GPP TSG-RAN WG2 #121, R2-2301196, Agenda: 8.4.2.1, Ericsson, Feb. 27-Mar. 3, 2023, pp. 1-14. No copy provided, per MPEP 609. Copy submitted in parent U.S. Appl. No. 18/888,296.
"Discussion on L1/L2 inter-cell mobility delay requirements," 3GPP TSG-RAN WG4 Meeting #107, R4-2308329, Agenda: 8.25.2.3, Huawei, May 22-26, 2023, pp. 1-4. No copy provided, per MPEP 609. Copy submitted in parent U.S. Appl. No. 18/888,296.
European Search Report dated Feb. 27, 2025 corresponding to European Patent Application No. 24201345.6.
Apple Inc., "Dissecting the UE processing for RRC LTM config," R2-2211711, 3GPP TSG RAN WG2#120, Toulouse, France, Nov. 14-18, 2022, Nov. 4, 2022, XP052215815.
Nokia et al., "Discussion on LTM cell switch delay requirements," R4-2309491, 3GPP TSG-RAN WG4 Meeting #107, Incheon, Korea, May 22-26, 2023, May 15, 2023, XP052318207.
Communication pursuant to Article 94(3) EPC dated Mar. 11, 2025, corresponding to European Patent Application No. 24201345.6.

* cited by examiner

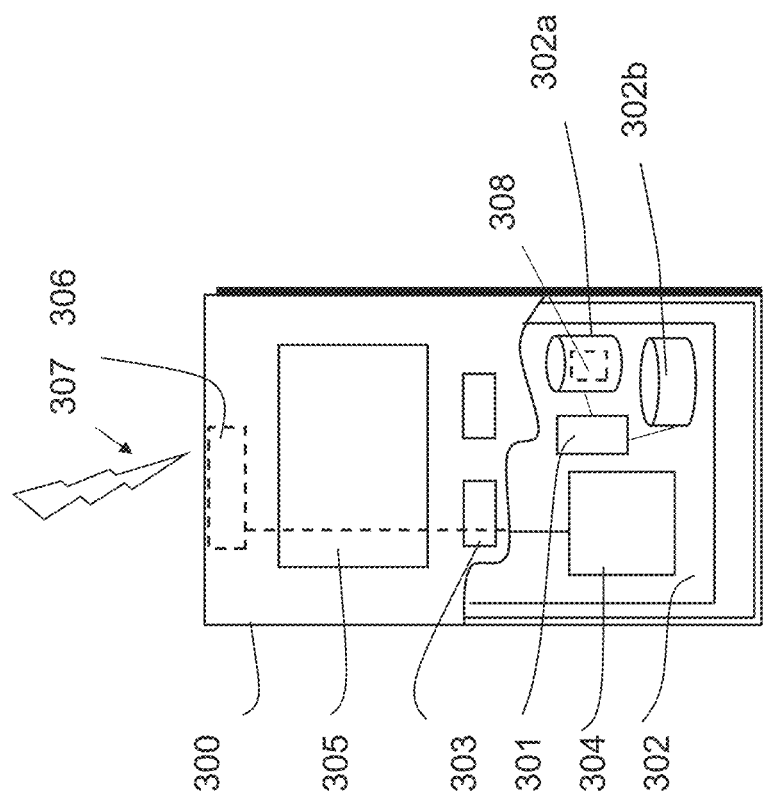

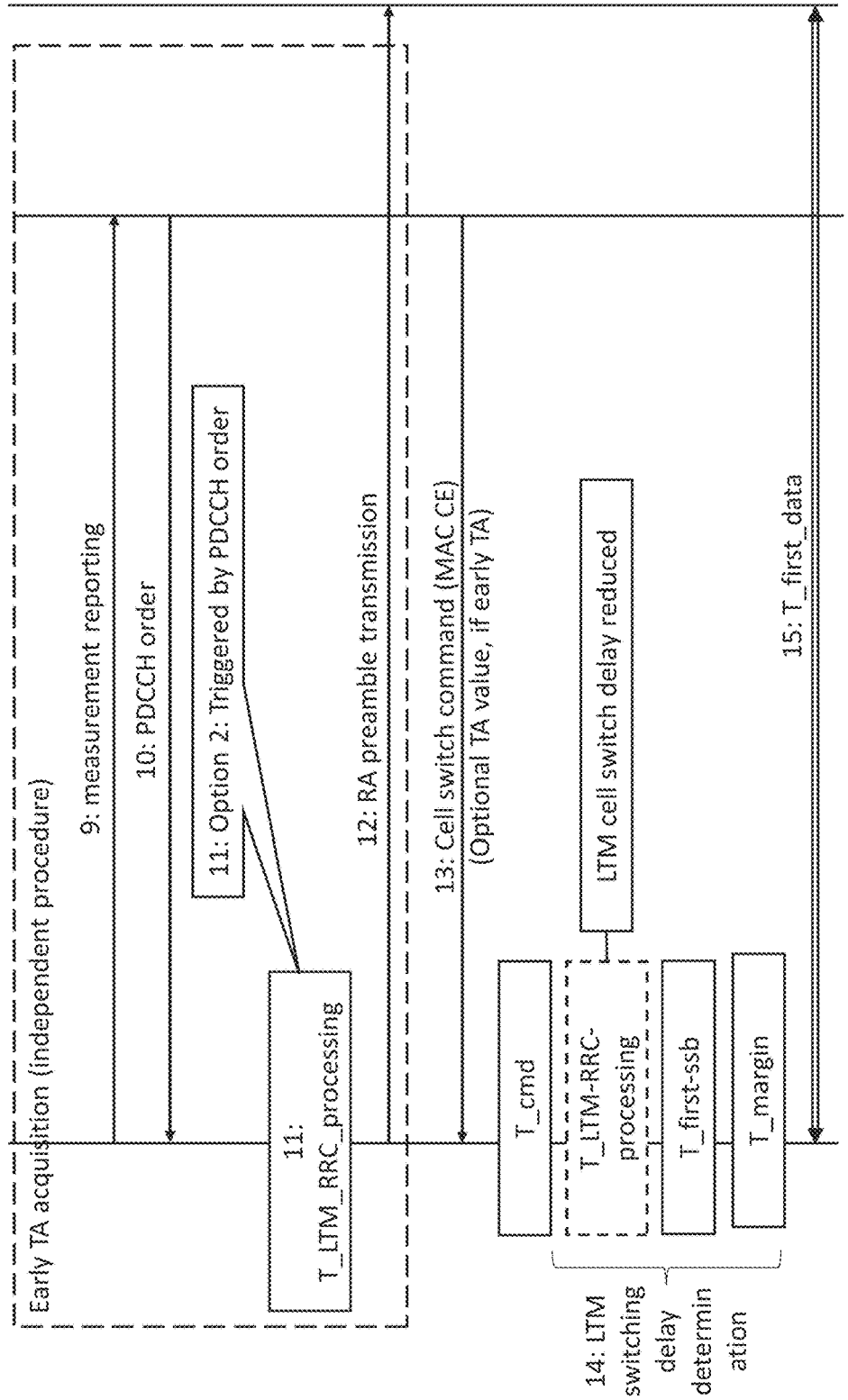

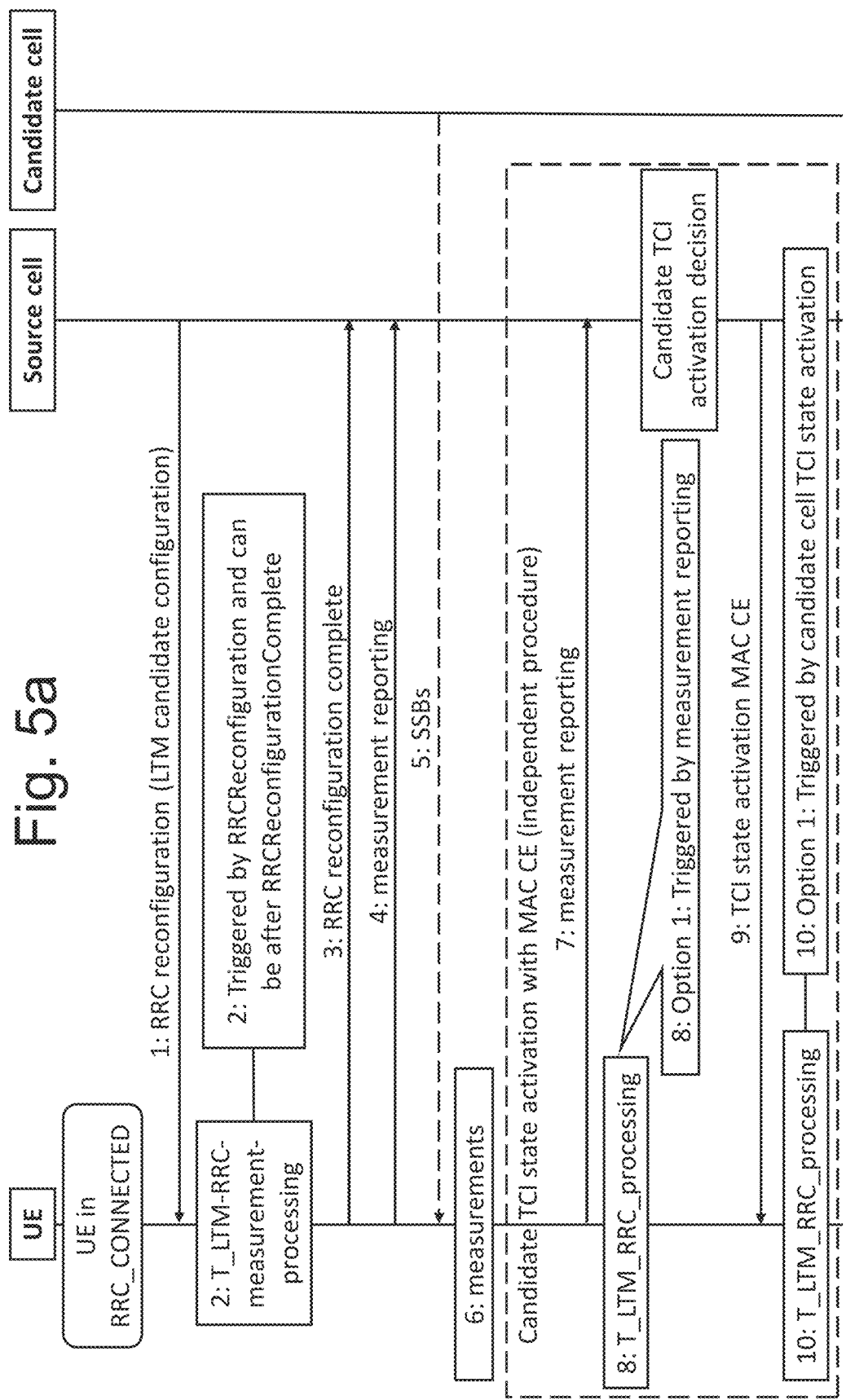

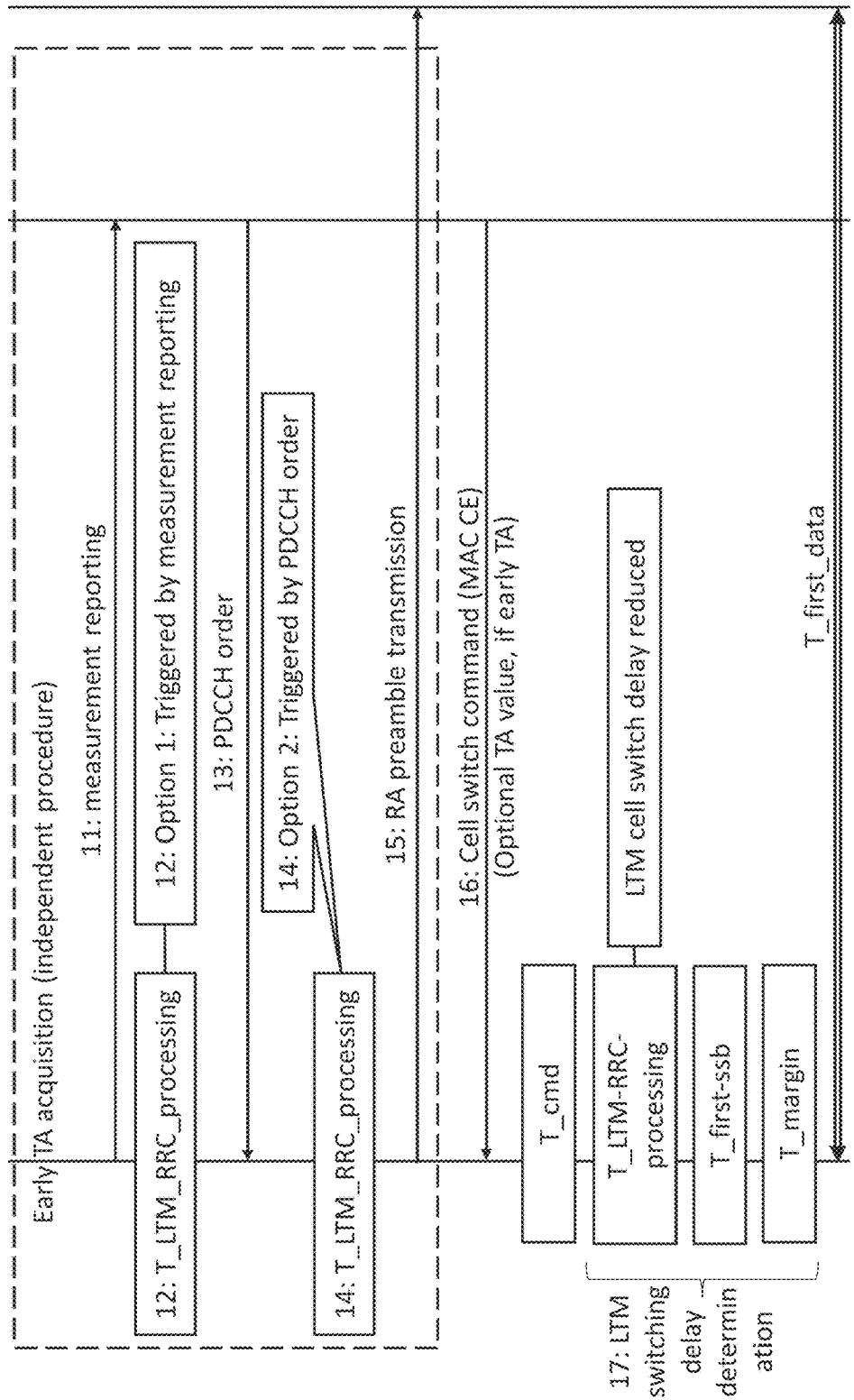

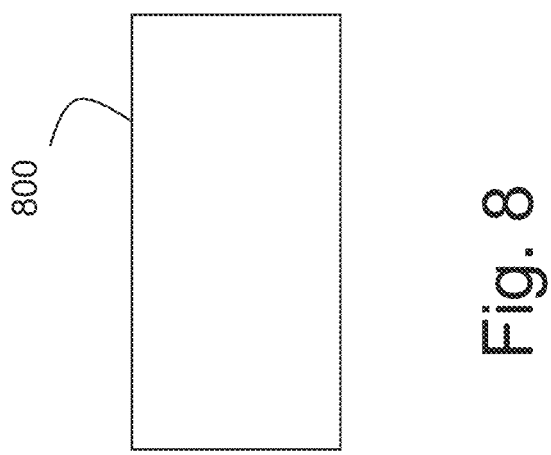

METHOD, APPARATUS AND COMPUTER PROGRAM

CROSS REFERENCE TO RELATED APPLICATION

This is a Continuation of U.S. patent application Ser. No. 18/888,296 filed Sep. 18, 2024, which claims priority from United Kingdom Patent Application No. 2314828.1, dated Sep. 27, 2023. The contents of these applications are hereby incorporated by reference.

FIELD

The present application relates to an apparatus, method and computer program. In particular, but not exclusively, the present application relates to managing lower layer triggered mobility in a communication system.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect there is provided an apparatus comprising: means for receiving, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell; means for decoding the first configuration information; means for performing the at least one measurement for the at least one candidate cell based on the first configuration information; means for transmitting, on the source cell, a measurement report comprising at least one result of the at least one measurement; means for receiving, on the source cell, a message triggering the apparatus to decode the second configuration information; means for decoding the second configuration information; means for receiving, on the source cell, a command to switch the apparatus from the source cell to a target cell selected amongst the at least one candidate cell; and means for switching from the source cell to the target cell based on the second configuration information.

The message may comprise: a request to perform timing advance acquisition for the at least one candidate cell.

The request may be a physical downlink control channel order configured to cause the apparatus to transmit a preamble on a physical random access channel of the at least one candidate cell.

The apparatus may comprise: means for performing timing advance acquisition for the at least one candidate cell.

The message may comprise: a request to add at least one transmission configuration information state for the at least one candidate cell to a list of active transmission configuration information states.

The apparatus may comprise: means for adding the at least one transmission configuration information state to the list of active transmission configuration information states.

The request may be received in a medium access control control element.

The apparatus may comprise: means for determining a delay to transmit on the target cell from the reception of the command to switch the apparatus from the source cell to the target cell, wherein the delay comprises a component accounting for decoding the second configuration information subsequent to the reception of the command set to zero; and means for transmitting, on the target cell, within the delay.

The apparatus may comprise: means for transmitting data on a physical uplink shared channel of the target cell; means for transmitting control on a physical uplink control channel of the target cell; or means for transmitting a preamble on a physical random access channel of the target cell.

The delay may further comprise at least one of: a component accounting for transmitting, on the source cell, an acknowledgement of the reception of the command; a component accounting for applying the second configuration information for the target cell; a component accounting for acquiring timing information for the target cell; a component accounting for a margin after acquiring timing information for the target cell; a component accounting for waiting for a physical random access channel resource on the target cell; a component accounting for waiting for a physical uplink shared channel resource on the target cell; or a component accounting for waiting for a physical uplink control channel resource on the target cell.

The command may be received in a medium access control control element.

The apparatus may comprise: means for determining an apparatus capability; and means for allowing to decode the second configuration information based on the apparatus capability.

The apparatus capability may comprise at least one of: a capability to decode the r second configuration information for a single candidate cell; or a capability to decode second configuration information for multiple candidate cells.

The apparatus may comprise: means for storing a single transmission configuration information state for a single candidate cell; or means for storing multiple transmission configuration information states for multiple candidate cells.

The apparatus may comprise: means for storing N transmission configuration information states for N candidate cells, wherein the N transmission configuration information states for N candidate cells are the N transmission configuration information states the most recently added to the list of active TCI states.

The apparatus may comprise: means for performing at least one measurement for the at least one candidate cell; and means for transmitting, on the source cell, a measurement report comprising at least one result of the at least one the measurement for the least one candidate cell.

The source cell and the at least one candidate cell may be served by a same base station; or the source cell and the at least one candidate cell may be served by different base stations.

The apparatus may be a user equipment.

According to an aspect, there is provided an apparatus comprising at least one processor and at least one memory storing instructions that, when executed by the at least one processor, cause the apparatus at least to: receive, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell; decoding the first configuration information; perform the at least one measurement for the at least one candidate cell based on the first configuration information; transmit, on the source cell, a measurement report comprising at least one result of the at least one measurement; receive, on the source cell, a message triggering the apparatus to decode the second configuration information; decode the second configuration information; receive, on the source cell, a command to switch the apparatus from the source cell to a target cell selected amongst the at least one candidate cell; and switch from the source cell to the target cell based on the second configuration information.

According to an aspect there is provided a method, comprising: receiving, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell; decoding the first configuration information; performing the at least one measurement for the at least one candidate cell based on the first configuration information; transmitting, on the source cell, a measurement report comprising at least one result of the at least one measurement; receiving, on the source cell, a message triggering the apparatus to decode the second configuration information; means for decoding the second configuration information; receiving, on the source cell, a command to switch an apparatus from the source cell to a target cell selected amongst the at least one candidate cell; and switching from the source cell to the target cell based on the second configuration information.

The method may be performed by an apparatus.

The message may comprise: a request to perform timing advance acquisition for the at least one candidate cell.

The request may be a physical downlink control channel order configured to cause the apparatus to transmit a preamble on a physical random access channel of the at least one candidate cell.

The method may comprise: performing timing advance acquisition for the at least one candidate cell.

The message may comprise: a request to add at least one transmission configuration information state for the at least one candidate cell to a list of active transmission configuration information states.

The method may comprise: adding the at least one transmission configuration information state to the list of active transmission configuration information states.

The request may be received in a medium access control control element.

The method may comprise: determining a delay to transmit on the target cell from the reception of the command to switch the apparatus from the source cell to the target cell, wherein the delay comprises a component accounting for decoding the second configuration information subsequent to the reception of the command set to zero; and transmitting, on the target cell, within the delay.

The method may comprise: transmitting data on a physical uplink shared channel of the target cell; transmitting control on a physical uplink control channel of the target cell; or transmitting a preamble on a physical random access channel of the target cell.

The delay may further comprise at least one of: a component accounting for transmitting, on the source cell, an acknowledgement of the reception of the command; a component accounting for applying the second configuration information for the target cell; a component accounting for acquiring timing information for the target cell; a component accounting for a margin after acquiring timing information for the target cell; a component accounting for waiting for a physical random access channel resource on the target cell; a component accounting for waiting for a physical uplink shared channel resource on the target cell; or a component accounting for waiting for a physical uplink control channel resource on the target cell.

The command may be received in a medium access control control element.

The method may comprise: determining an apparatus capability; and allowing to decode the second configuration information based on the apparatus capability.

The apparatus capability may comprise at least one of: a capability to decode the r second configuration information for a single candidate cell; or a capability to decode second configuration information for multiple candidate cells.

The method may comprise: storing a single transmission configuration information state for a single candidate cell; or storing multiple transmission configuration information states for multiple candidate cells.

The method may comprise: storing N transmission configuration information states for N candidate cells, wherein the N transmission configuration information states for N candidate cells are the N transmission configuration information states the most recently added to the list of active TCI states.

The method may comprise: performing at least one measurement for the at least one candidate cell; and transmitting, on the source cell, a measurement report comprising at least one result of the at least one the measurement for the at least one candidate cell.

The source cell and the at least one candidate cell may be served by a same base station; or the source cell and the at least one candidate cell may be served by different base stations.

The apparatus may be a user equipment.

According to an aspect there is provided a computer readable medium comprising instructions which, when executed by an apparatus, cause the apparatus to perform at least the following: receive, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell; decoding the first configuration information; perform the at least one measurement for the at least one candidate cell based on the first configuration information; transmit, on the source cell, a measurement report comprising at least one result of the at least one measurement; receive, on the source cell, a message triggering the apparatus to decode the second configuration information; decode the second configuration information; receive, on the source cell, a command to switch an apparatus from the source cell to a target cell selected amongst the at least one candidate cell; and switch from the source cell to the target cell based on the second configuration information.

According to an aspect there is provided a non-transitory computer readable medium comprising program instructions that, when executed by an apparatus, cause the apparatus to perform at least the following: receive, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell; decoding the first configuration information; perform the at least one measurement for the at least one candidate cell based on the first configuration information; transmit, on the source cell, a measurement report comprising at least one result of the at least one measurement; receive, on the source cell, a message triggering the apparatus to decode the second configuration information; decode the second configuration information; receive, on the source cell, a command to switch the apparatus from the source cell to a target cell selected amongst the at least one candidate cell; and switch from the source cell to the target cell based on the second configuration information.

Various other aspects are also described in the following detailed description and in the attached claims.

LIST OF ABBREVIATIONS

AF: Application Function
AI: Artificial Intelligence
AMF: Access and Mobility Management Function
API: Application Programming Interface
BS: Base Station
CE: Control Element
CU: Centralized Unit
DCI: Downlink Control Information
DL: Downlink
DU: Distributed Unit
gNB: gNodeB
GSM: Global System for Mobile communication
HSS: Home Subscriber Server
IE: Information Element
IoT: Internet of Things
LMF: Location Management Function
LPP: Location Positioning Protocol
LTE: Long Term Evolution
LTM: Lower layer Triggered Mobility or L1/L2-triggered mobility
MAC: Medium Access Control
ML: Machine Learning
MS: Mobile Station
MTC: Machine Type Communication
NEF: Network Exposure Function
NF: Network Function
NR: New radio
NRF: Network Repository Function
PDCCH: Physical Downlink Control Channel
PRACH: Physical Random Access Channel
PUCCH: Physical Uplink Control Channel
PUSCH: Physical Uplink Shared Channel
PDU: Packet Data Unit
RA: Random Access
RAM: Random Access Memory
(R)AN: (Radio) Access Network
ROM: Read Only Memory
RRC: Radio Resource Control
SMF: Session Management Function
SSB: Synchronization Signal Block
TA: Timing Advance
TR: Technical Report
TS: Technical Specification
TTI: Transmission Time Interval
UE: User Equipment
UMTS: Universal Mobile Telecommunication System
3GPP: 3rd Generation Partnership Project
5G: 5th Generation
5GC: 5G Core network
5GS: 5G System

BRIEF DESCRIPTION OF THE FIGURES

Embodiments will now be described, by way of example only, with reference to the accompanying Figures in which:

FIG. 3 shows a schematic representation of a user equipment;

FIG. 4a and FIG. 4b show a signaling diagram of a process for managing LTM in a 5G system;

FIG. 5a and FIG. 5b show a signaling diagram of another process for managing LTM in a 5G system;

FIG. 8 shows a schematic representation of a non-volatile memory medium storing instructions which when executed by a processor allow a processor to perform one or more of the steps of the methods of FIG. 6 and FIG. 7.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIG. 1, FIG. 2 and FIG. 3 to assist in understanding the technology underlying the described examples.

Figure 1:
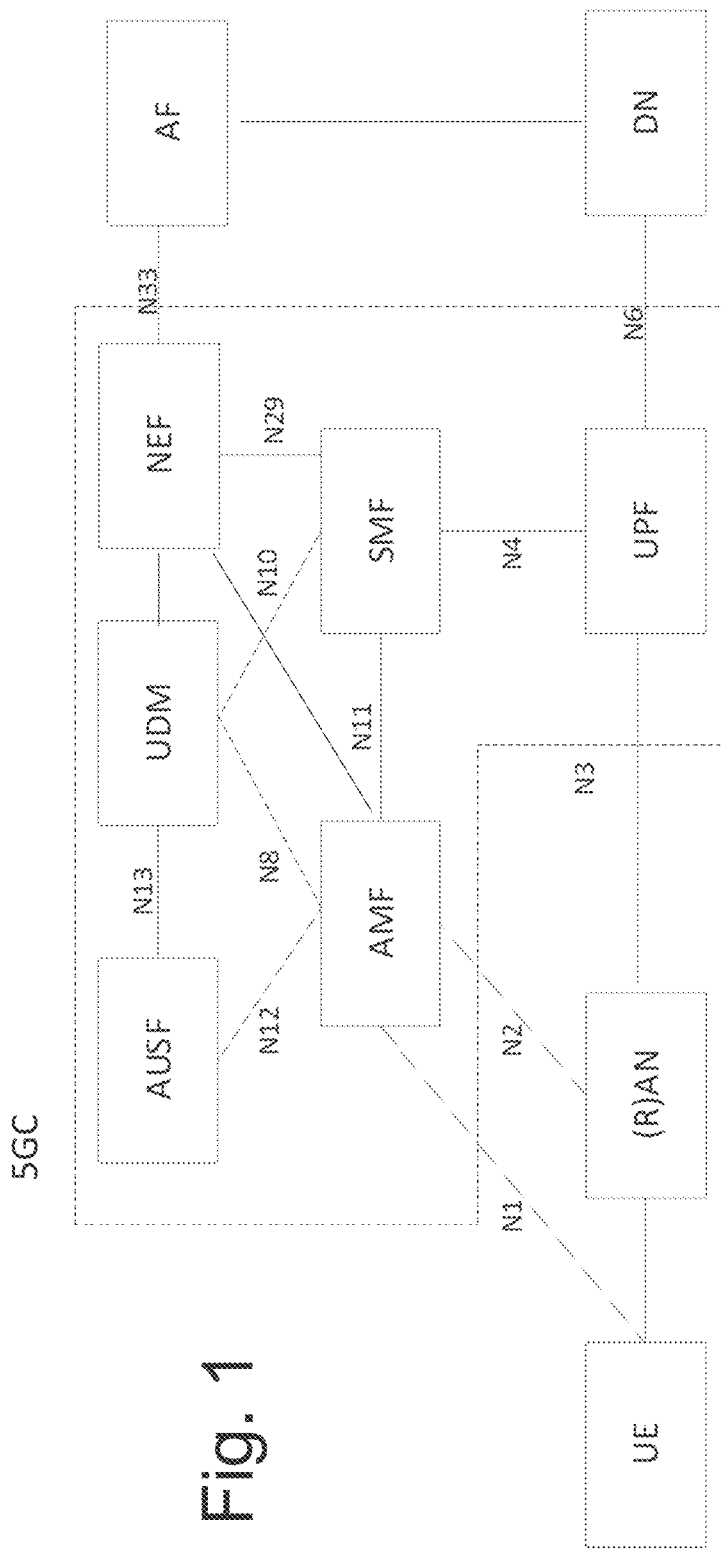
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF), a network exposure function (NEF), a unified data repository (UDR), an application function (AF) and/or a location management function (LMF).

Figure 2:
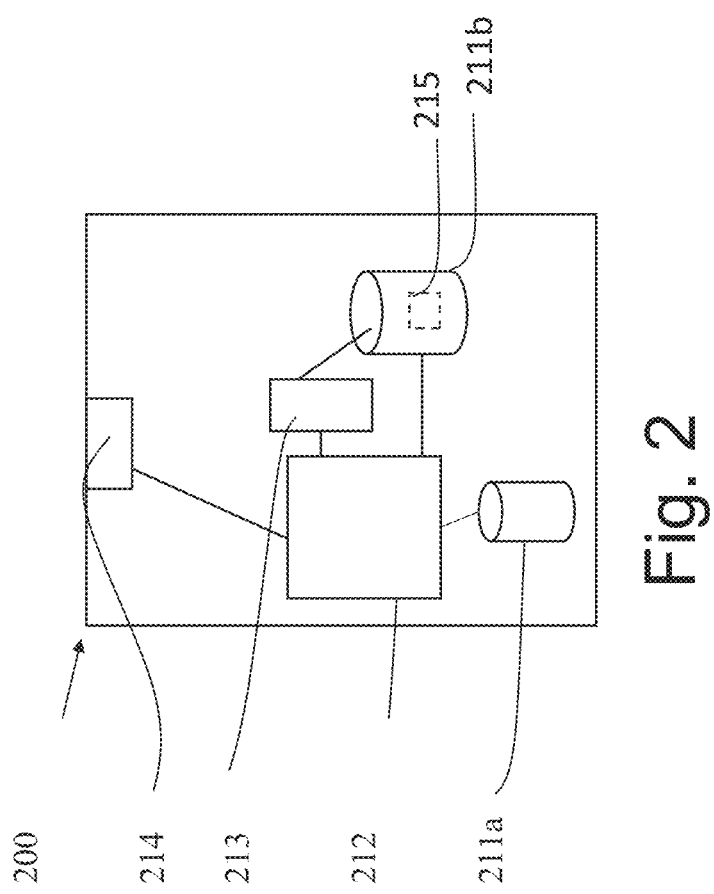
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relates to lower layer triggered mobility or L1/L2-triggered mobility (LTM) in a communication system.

LTM may refer to switching a UE from a source cell to a target cell triggered via lower layer signalling as opposed to switching a UE from a source cell to a target cell triggered upper layer signalling. Lower layer signalling may refer to layer 1 signalling (e.g. downlink control information (DCI)) or layer 2 signalling (e.g. medium access control (MAC) control element (CE)). Upper layer signalling may refer to layer 3 signalling (e.g. radio resource control (RRC) signalling). The target cell may be selected amongst candidate cells based on at least one of layer 1, layer 2, or layer 3 measurements for the candidate cells.

One or more aspects of this disclosure relates to managing LTM mobility in a communication system so that a latency between a UE receiving a command to switch the UE from the source cell to the target cell and the UE transmitting on the target cell is minimized.

Such objective may be achieved by configuring the UE to (fully) decode RRC configurations for candidate cells prior to receiving the command to switch the UE from the source cell to the target cell as opposed to subsequent to receiving the layer 1 or layer 2 signalling triggering the LTM cell switch of the UE from the source cell to the target cell.

Decoding RRC configurations for a candidate cell may comprise at least one of creating a complete RRC configuration for the candidate cell from a reference RRC configuration and a delta RRC configuration, performing ASN.1 validation (e.g. syntax check) or retrieving/interpreting information of the candidate cell.

In this way, the RRC configuration for the target cell does not need to be decoded subsequent to receiving the command to switch the UE from the source cell to the target cell and therefore the latency between the UE receiving the command to switch the UE from the source cell to the target cell and the UE transmitting on the target cell is minimized.

It will be understood that a RRC configuration for at least one candidate cell may comprise first configuration information for performing at least one of layer 1, layer 2, or layer 3 measurements for the candidate cell.

It will be understood that a RRC configuration for at least one candidate cell may comprise second configuration information for switching from the source cell to the candidate cell (should one of the at least one candidate cell be selected as the target cell).

It will be understood that the RRC configuration may consist of the first configuration information and the second configuration information. That is, the RRC configuration may only comprise the first configuration information and the second configuration information. Alternatively, the RRC configuration may comprise the first configuration information and the second configuration information. That is, the RRC configuration may comprise not only the first configuration information and the second configuration information but also additional configuration information. In an implementation, the UE may be configured to decode the first configuration information in response to receiving, on the source cell, the RRC configurations for the candidate cells in a RRC reconfiguration message. The UE may be configured to decode the second configuration information in response to receiving, on the source cell, a request to perform time acquisition (TA) for the at least one target cell. The request may be a physical downlink control channel (PDCCH) order configured to cause the UE to transmit a random access (RA) preamble on a physical random access channel (PRACH) of one of the candidate cells.

In an implementation, the UE may be configured to decode the first configuration information in response to receiving, on the source cell, the RRC configurations for the at least one candidate cell in a RRC reconfiguration message. The UE may be configured to decode the second configuration information in response to receiving, on the source cell, a request to add a transmission control information (TCI) state to a list of active TCI states in a MAC CE. The request may be transmitted via a TCI state activation MAC CE.

In an implementation, the UE may be configured to decode the first configuration information in response to receiving, on the source cell, the RRC configurations for the candidate cells in a RRC reconfiguration message. The UE may be configured to decode the second configuration information in response to transmitting, on the source cell, a measurement report comprising the at least one of layer 1, layer 2, or layer 3 measurements of the candidate cells.

In an implementation, the UE may be configured to decode both the first configuration information and the second configuration information in response to receiving, on the source cell, the RRC configurations for the candidate cells in a RRC reconfiguration message.

The source cell may be served by a BS (e.g., gNB). The candidate cells may be served by the same BS (i.e. intra-BS switch) of by another base station (i.e. inter-BS switch). The BS may or may not be aware of the implementation used by the UE to decode the RRC configurations for the candidate cells. The UE may transmit, to the BS on the source cell, information explicitly or implicitly indicating the implementation used by the UE to decode the RRC configurations for the candidate cells.

Figure 4A:
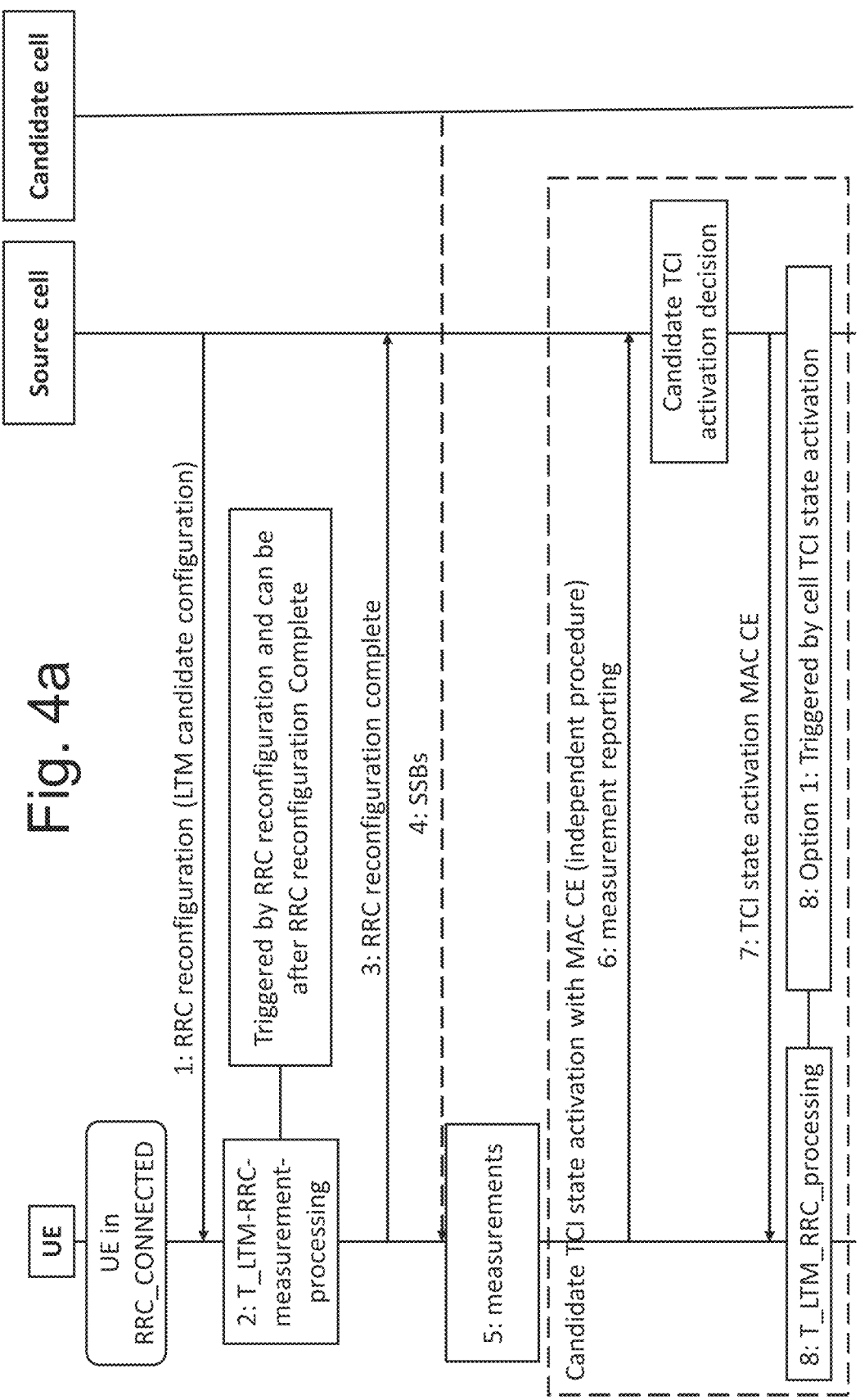

FIG. 4a and FIG. 4b show a signaling diagram of a process for LTM in a 5GS.

Initially, a UE may be served by a source cell provided by a gNB. The UE may be in an RRC connected state. The UE may perform at least one of layer 1, layer 2 or layer 3 measurements of the source cell and other detected cells, for example possible candidate cells. For example, the layer 1 measurements may comprise synchronization signal block (SSB) measurements and/or channel state information (CSI) reference signal (RS) measurements. The UE may perform layer 3 measurements of the source cell based on the layer 1 measurements of the source cell.

The UE may transmit, to the gNB on the source cell, a report comprising result of at least one the layer 1, the layer 2, or layer 3 measurements of the source cell.

In step 1, the UE may receive, from the gNB on the source cell, a RRC reconfiguration message comprising RRC configurations for candidate cells. For example, the gNB may select the one or more candidate cells based on at least one of the layer 1, layer 2, or layer 3 measurements of the candidate cells performed by the UE based on a previous RRC reconfiguration message. The RRC reconfiguration message may comprises at least one of first configuration information or second configuration information.

In step 2, the UE may extract and decode the first configuration information of the candidate cells. The UE may not be required to perform RRC ASN.1 validation for the second configuration at the moment. The UE will extract and decode the second configuration information for the candidate cells, when the UE receives a triggering message or indication. The UE may also select not to decode full second configuration, but only resolve it partially. For example UE may resolve the second configuration to identify the configuration association to the identifiers candidate cells. That is, the UE may partially extract and decode the RRC configurations in step 2.

In step 3, the UE may transmit, on the source cell, a RRC reconfiguration complete message.

It will be understood that step 2 and step 3 may be reversed.

In step 4, the UE may receive, on the one or more selected candidate cells, synchronisation signal blocks (SSBs).

In step 5, the UE may perform at least one of layer 1, layer 2, or layer 3 measurements of the candidate cells by using the first configuration information.

In step 6, the UE may transmit, on the source cell, a measurement report comprising result of the at least one layer 1, layer 2 or layer 3 measurements of the candidate cells. The gNB may determine that TCI states for some or all of the candidate cells are to be added to a list of active TCI states stored at the UE.

In step 7, the UE may receive, on the source cell, a MAC CE comprising a request to add TCI states for some or all of the candidate cells to the list of active TCI states stored at the UE. The request may comprise cell identifiers for some or all of the candidate cells. The request may be the TCI state activation MAC CE.

In step 8, the UE may extract and decode the second configuration information for some or all of the candidate cells the TCI state of which was added to the list of active TCI states. The UE performs LTM RRC processing with the second configuration information in advance i.e. before the cell switch command. By doing this, the UE does not need to do the LTM_RRC_processing procedure when the UE performs the cell switching to the target cell and the cell switch delay is able to be reduced.

Alternatively, in step 9, the UE may transmit, on the source cell, a measurement report comprising results of at least one of the layer 1, layer 2 or layer 3 measurements of the candidate cells.

In step 10, the UE may receive, on the source cell, a PDCCH order causing the UE to perform random access procedure for acquiring timing advance (TA) for one or more candidate cells. The PDCCH order may cause the UE to transmit a random access (RA) preamble on a PRACH of one or more of the candidate cells. The PDCCH order also cause the UE to perform the LTM RRC processing in advance by using the second configuration information. The LTM RRC processing may be either directly after the PDCCH order reception, or it may be after UE has performed the PRACH preamble transmission successfully.

In step 11, the UE may extract and decode the second configuration information for the one or more candidate cells. The one or more candidate cells may be decided based on the measurements in step 5.

In step 12, the UE may transmit, on a PRACH of one or more of the candidate cells, a RA preamble.

Steps 6 to 8 are performed for candidate TCI state activation procedure and steps 9 to 12 are performed for the early TA acquisition procedure. Steps 6 to 8 and steps 9 to 12 are independent of each other. The UE may perform the LTM RRC processing by using the second configuration information when the UE receives the trigger at step 7 or step 9. The trigger for performing the LTM RRC processing may be one or both of the TCI state activation MAC CE or the PDCCH order.

In step 13, the UE may receive, on the source cell, a MAC CE comprising a command to switch the UE from the source cell to a target cell. The target cell may be selected by the gNB amongst the candidate cells based on at least one of the layer 1, layer 2, or layer 3 measurements for the candidate cells received in step 6 or in step 9.

If the UE receives the cell switch command, then the UE performs the cell switching from the source cell to the target cell. For performing the cell switching, the UE may calculate the cell switch delay.

Step 14 represents the UE cell switch delay $D_{LTM}$ for the cell switching procedure. The LTM switch delay $D_{LTM}$ may be the delay from the end of the last TTI containing the MAC CE command for cell switch until the UE transmits the first UL message on the target cell. In order to determine the delay, there is a need to determine the values (e.g., components) including at least one of $T_{cmd}$, $T_{LTM-RRC-processing}$, $T_{first-ssb}$, $T_{delta}$, and/or $T_{margin}$. However, the UE has already performed the LTM RRC processing at step 8 or 11, thus the UE does not need the $T_{LTM-RRC-processing}$ value any more during the cell switching procedure. By doing this, the cell switching delay can be reduced at the cell switching procedure. The calculation will be explained in detail below. For example, the UE may calculate the delay $D_{LTM}$ to transmit on the target cell from the end of the transmission time interval (TTI) comprising the MAC CE with the command to switch the UE from the source cell to the target cell.

The UE may be allowed to transmit or receive data or control information on the target cell within the delay $D_{LTM}$. The UE may not be allowed to transmit on the target cell within the delay $D_{LTM}$. The delay $D_{LTM}$ may be referred to as a cell switch delay.

Transmission on the target cell may comprise transmitting data or control information on a physical uplink shared channel (PUSCH) or physical uplink control channel (PUCCH) of the target cell, and reception on the target cell may comprise receiving data or control information on a physical downlink shared channel (PDSCH) or physical downlink control channel (PDCCH). Transmitting on the target cell may comprise transmitting a RA preamble on a PRACH of the target cell.

The delay $D_{LTM}$ may be expressed in step 14 as follows:

$$D_{LTM} = T_{cmd} + T_{LTM\text{-}RRC\text{-}processing} + T_{LTM\text{-}interrupt}$$

$$T_{LTM\text{-}interrupt} = T_{LTM\text{-}processing} + T_{first\text{-}SSB} + T_{margin} + T_{LTM\text{-}IU}.$$

The delay $D_{LTM}$ may comprise a component $T_{cmd}$ may account for transmitting, on the source cell, an acknowledgement of the reception of the command to switch the UE from the source cell to the target cell. The component $T_{cmd}$ may be equal to $T_{HARQ}+3$ ms, where $T_{HARQ}$ is the time between receiving the command to switch the UE from the source cell to the target cell and transmitting the acknowledgement (e.g. as specified in 3GPP TS 38.213). The component $T_{cmd}$ may be expressed as follows:

$$T_{cmd} = T_{HARQ} + 3N_{slot}^{subframe,\mu}$$

The delay $D_{LTM}$ may comprise a component $T_{LTM-RRC-processing}$ accounting for decoding the second configuration information for the target cell subsequent to receiving the command to switch the UE from the source cell to the target cell. If the second configuration information for the target cell has been decoded in step 8 or step 11 prior to receiving the command to switch the UE from the source cell to the target cell in step 13, the component $T_{LTM-RRC-processing}$ may be set to a zero value. If the second configuration information for the target cell has not been decoded in step 8 or step 11 prior to receiving the command to switch the UE from the source cell to the target cell in step 13, the component $T_{LTM-RRC-processing}$ processing may be set to a non-zero value. The non-zero value may be a default value (e.g. up to 10 ms).

The delay $D_{LTM}$ may comprise a component $T_{LTM-processing}$ accounting for applying the second configuration information for the target cell.

The delay $D_{LTM}$ may comprise a component $T_{first-SSB}$ accounting for time tracking and acquiring timing information for the target cell. In some cases, for example if the TCI state of the target cell is in the list of active TCI states stored by the UE, the component $T_{first-SSB}$ may be set to a zero value. In other cases, for example if the TCI state of the target cell is not in the list of active TCI states stored by the UE, the component $T_{first-SSB}$ may be set to a non-zero value. The non-zero value may account for a time between receiving the command to switch the UE from the source cell to the target cell and receiving a first SSB on the target cell. The non-zero value may be a default value (e.g. up to 160 ms). In some cases, $T_{first-SSB}$ may also refer to the first transmission of another reference signal, such as TRS (transmission reference signal).

The delay $D_{LTM}$ may comprise a component $T_{margin}$ accounting for UE processing time of the reference signal (e.g. SSB) measured in T first-SSB. The component $T_{margin}$ may be set to a non-zero value. The non-zero value may be a default value (e.g. up to 2 ms).

The delay $D_{LTM}$ may comprise a component $T_{LTM-IU}$ accounting for waiting for a resource to transmit on the target cell. If the UE performs a RACH procedure with the target cell, the component $T_{LTM-IU}$ may account for waiting for a PRACH resource to transmit a RA preamble on the target cell. The component $T_{LTM-IU}$ may be up to the summation of a SSB to PRACH resource associated period (e.g. specified in table 8.1-1 of 3GPP TS 38.213) and a non-zero value. The non-zero value may be a default value (e.g. up to 160 ms).

If the UE does not perform a RACH procedure with the target cell, the component $T_{LTM-IU}$ may account for waiting for a PUSCH or PUCCH resource to transmit a data or control on the target cell. The UE may switch from the source cell to the target cell. The UE may transmit, on the target cell, within the delay $D_{LTM}$.

It will be understood that aspects relating to the decoding of the second configuration information for the candidate cells in step 8 or in step 11 may be specified in the standards.

It will be understood that aspects relating to the delay $D_{LTM}$ may be specified in the standards. For example, 3GPP TS 38.133 may include the following clauses.

6.X.1.2 LTM Cell Switch Delay

LTM cell switch delay $D_{LTM}$ is the delay from the end of the last TTI containing the MAC-CE command for cell switch until the time the UE transmits the first UL message on the target cell, $$D_{LTM} = T_{cmd} + T_{LTM\text{-}RRC\text{-}processing} + T_{LTM-interrupt},$$

Where $T_{cmd}$ equals to $T_{HARQ}+3$ ms, where $T_{HARQ}$ is the timing between cell switch command and acknowledgement as specified in TS 38.213

$T_{LTM\text{-}RRC\ processing}$ is the time for UE decoding and validity check for the RRC configuration of the target cell.

$T_{LTM\text{-}RRC\ processing}=0$ if the the UE has performed early decoding and early validity check of the complete LTM candidate cell configuration according to TS 38.331 prior to the cell switch command for the target cell indicated in the cell switch command, otherwise $T_{LTM\text{-}RRC\ processing}=[10]$ ms.

$T_{LTM\text{-}RRC\ processing}=0$ after PDCCH order has been performed before the cell switch command $T_{LTM\text{-}RRC\ processing}=0$ after candidate cell TCI state activation has been performed before the cell switch command $T_{LTM-interrupt}$ is as stated in section 6.X.1.2.1.

6.X.1.2.1 Interruption Time

The interruption time is the time between end of the last TTI containing containing the MAC-CE command for cell switch until the time the UE transmits the first UL message on the target cell, excluding $T_{cmd}$ and $T_{LTM\text{-}RRC\ processing}$ stated in section 6.X.1.2.

$$T_{LTM-interrupt} = T_{LTM-processing} + T_{first-RS} + T_{margin} + T_{LTM-IU}\text{ms}$$

It will be understood that decoding the second configuration information for the candidate cells in step 8 or in step 11 may be based on a UE capability. The UE capability may comprise a UE capability to decode the second configuration information for the candidate cells in step 8 or in step 11, that is a UE capability to decode the second configuration information for the candidate cells "early" (e.g., before receiving the command to switch from the source cell to the target cell in step 13). The UE capability may comprise a UE capability to decode the second configuration information for a single candidate cell. The UE capability may comprise a UE capability to decode the second configuration information for multiple candidate cells. For example, the UE may be capable of storing multiple TCI states for multiple candidate cells in the list of active TCI states. The UE may be capable of storing N TCI states for N candidate cells in the list of active TCI states, wherein the N TCI states for the for N candidate cells are the last N TCI states added by the UE to list of active TCI states. The UE capability may or may not be known by the gNB. For example, the UE may transmit, to the gNB on the source cell, information explicitly or implicitly indicating the UE capability.

It will be understood that one or more of steps 1 to 13 may be optional (e.g. redundant) and therefore may be omitted. It will be understood that, whilst steps 1 to 13 have been illustrated in a single signalling diagram, these steps 1 to 13 may not be part of a single implementation. One or more of steps 1 to 13 may be redundant or optional as explained above. One or more of steps 1 to 13 may be omitted to form different implementations.

It will be understood that, in the above, the source cell and the candidate cells may be served by the same gNB (i.e. intra-BS switch) or by another gNB (i.e. inter-BS switch). For example, the source cell and the at least one candidate cell are controlled by the serving gNB, or the source cell is controlled by the serving gNB and the at least one candidate cell is controlled by another gNB or gNBs.

FIG. 5a and FIG. 5b show a signaling diagram of another process for managing LTM in a 5GS.

Initially, a UE may be served by a source cell provided by a gNB. The UE may be in an RRC connected state. The UE may perform at least one of layer 1, layer 2 or layer 3 measurements of the source cell and other detected cells, for example possible candidate cells. The UE may perform layer 3 measurements of the source cell based on the layer 1 measurements of the source cell and other detected cells, for example, possible candidate cells.

The UE may transmit, on the source cell, a report comprising result of the at least one layer 1, layer 2 or layer 3 measurements of the source cell.

In step 1, the UE may receive, on the source cell, a RRC reconfiguration message comprising RRC configurations for candidate cells. For example, the gNB may select the candidate cells based on layer 1 or layer 3 measurements of the candidate cells performed by the UE based on a previous RRC reconfiguration message. The RRC reconfiguration message may comprises at least one of first configuration information or second configuration information.

In step 2, the UE may extract and decode of the first configuration information for the candidate cells. The UE may also extract and decode the second configuration information for the candidate cells. That is, the UE may (fully) extract and decode the RRC configurations for the candidate cells in step 2.

In step 3, the UE may transmit, on the source cell, a RRC reconfiguration complete message.

It will be understood that step 2 and step 3 may be reversed.

In step 4, the UE may perform at least one of layer 1, layer 2 or layer 3 measurements of the candidate cells by using the first configuration information.

In step 5, the UE may receive, on the candidate cells, synchronisation signal blocks (SSBs).

In step 6, the UE may perform at least one of layer 1, layer 2 or layer 3 measurements of the candidate cells (e.g. if not already done in step 4).

In step 7, the UE may transmit, on the source cell, a measurement report comprising results of the at least one layer 1, layer 2 or layer 3 measurements of the candidate cells (e.g. if not already done in step 4).

In step 8, the UE may extract and decode the second configuration information for the candidate cells (e.g. if not already done in step 2).

The gNB may determine that TCI states for some or all of the candidate cells are to be added to a list of active TCI states stored at the UE.

In step 9, the UE may receive, on the source cell, a MAC CE comprising a request to add TCI states for some or all of the candidate cells to the list of active TCI states stored at the UE. The request may comprise cell identifiers for some or all of the candidate cells. The request may be the TCI state activation MAC CE.

In step 10, the UE may extract and decode the second configuration information for some or all of the candidate cells (e.g. if not already done in step 2 or step 8) the TCI state of which was added to the list of active TCI states. The UE performs LTM RRC processing with the second configuration information in advance i.e. before the cell switch command. By doing this, the UE does not need to do the LTM_RRC_processing procedure when the UE performs the cell switching to the target cell and the cell switch delay is able to be reduced.

Alternatively, in step 11, the UE may transmit, on the source cell, a measurement report comprising results of the layer 1, layer 2 or layer 3 measurements of the candidate cells (e.g. if not already done in step 4).

In step 12, the UE may decode a remaining part of the RRC configurations for some or all of the candidate cells.

In step 13, the UE may receive, on the source cell, a PDCCH order causing the UE to perform TA for one of more of the candidate cells. The PDCCH order may cause the UE to transmit, to the gNB on a PRACH of one or more of the candidate cells, a random access (RA) preamble.

In step 14, the UE may decode for the second configuration information for the candidate cells (e.g. if not already done in step 2).

In step 15, the UE may transmit, on a PRACH of one or more of the candidate cells, a RA preamble.

Steps 7 to 10 are performed for candidate TCI state activation procedure and steps 11 to 15 are performed for the early TA acquisition procedure. Steps 7 to 10 and steps 11 to 15 are independent of each other. The UE may perform the LTM RRC processing by using the second configuration information when the UE receives the trigger at step 9 or step 13. The trigger for performing the LTM RRC processing may be one or both of the TCI state activation MAC CE or the PDCCH order.

In step 16, the UE may receive, on the source cell, a MAC CE comprising a command to switch the UE from the source cell to a target cell. The target cell may be selected by the gNB amongst the candidate cells based on at least one of the layer 1, layer 2 or layer 3 measurements for the candidate cells received in step 4, in step 7 or in step 11.

Step 17, represents the UE cell switch delay $D_{LTM}$ for the cell switching procedure (as explained above in reference to FIG. 4a and FIG. 4b).

The UE may switch from the source cell to the target cell. The UE may transmit or receive, on the target cell, within the delay $D_{LTM}$.

Here, if the second configuration for the target cell has been decoded in step 2, in step 8, in step 10, in step 12 or in step 14 prior to receiving the command to switch the UE from the source cell to the target cell in step 16, the component $T_{TLTM-RRC-processing}$-processing may be set to a zero value. If the second configuration information for the target cell has not been decoded in step 2, in step 8, in step 10, in step 12 or in step 14 prior to receiving the command to switch the UE from the source cell to the target cell in step 16, the component $T_{TLTM-RRC-processing}$ processing may be set to a non-zero value. The non-zero value may be a default value (e.g. up to 10 ms).

It will be understood that, whilst steps 1 to 17 have been illustrated in a single signalling diagram, these steps 1 to 17 may not be part of a single implementation. One or more of steps 1 to 17 may be redundant or optional as explained above. One or more of steps 1 to 17 may be omitted to be part of different implementations.

It will be understood that, in the above, the source cell and the candidate cells may be served by a same gNB (i.e. intra-BS switch) of by another gNB (i.e. inter-BS switch).

Figure 6:
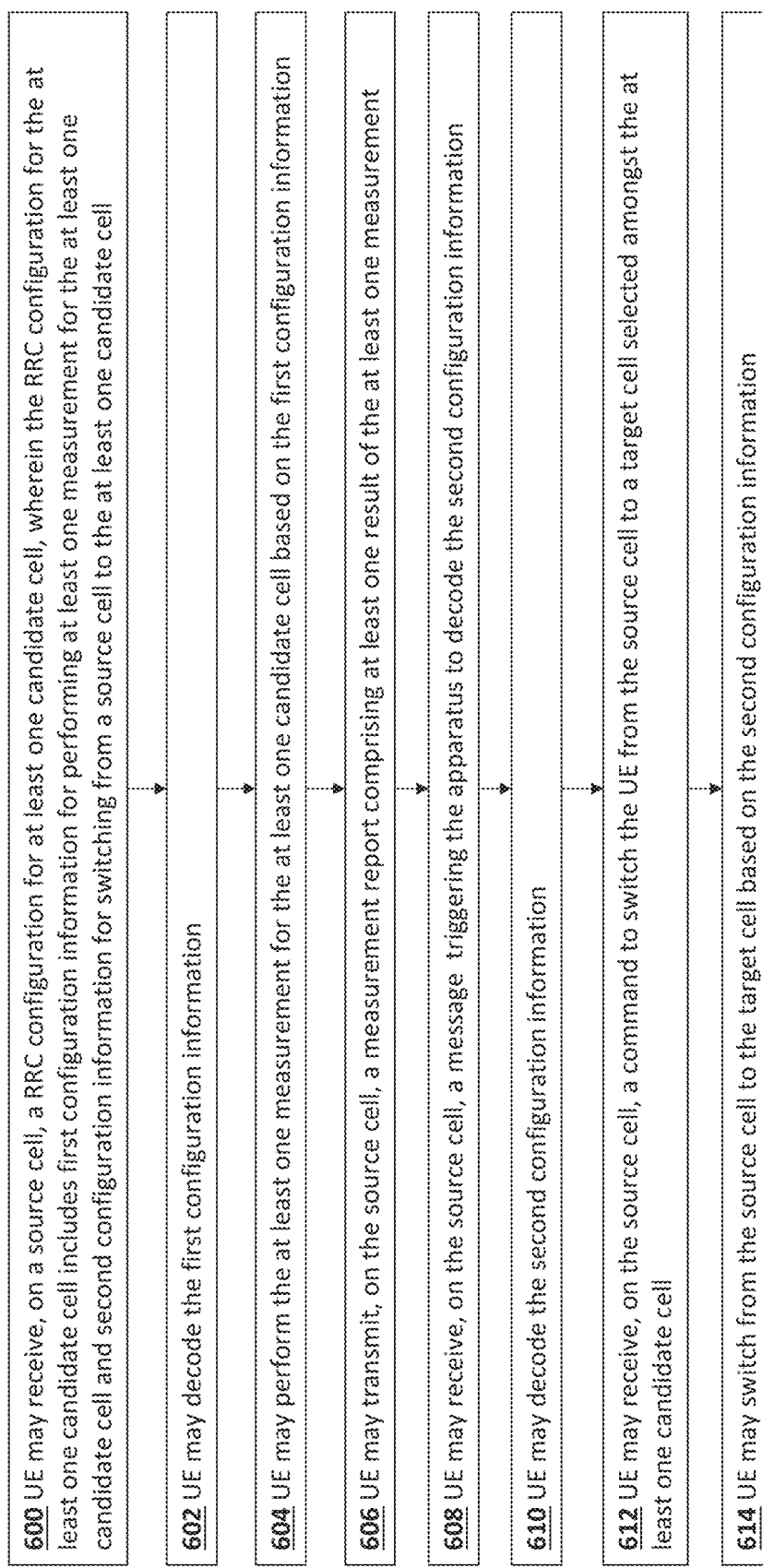
FIG. 6. shows a block diagram of a method for managing LTM in a 5G system performed by a user equipment.

FIG. 6. shows a block diagram of a method for managing LTM in a 5GS performed by a UE.

In step 600, the UE may receive, on a source cell, a RRC configuration for at least one candidate cell, wherein the RRC configuration for the at least one candidate cell includes first configuration information for performing at least one measurement for the at least one candidate cell and second configuration information for switching from a source cell to the at least one candidate cell.

In step 602, the UE may decode the first configuration information.

In step 604, the UE may perform the at least one measurement for the at least one candidate cell based on the first configuration information.

In step 606, the UE may transmit, on the source cell, a measurement report comprising at least one result of the at least one measurement.

In step 608, the UE may receive, on the source cell, a message triggering the UE to decode the second configuration information.

In step 610, the UE may decode the second configuration information.

In step 612, the UE may receive, on the source cell, a command to switch the UE from the source cell to a target cell selected amongst the at least one candidate cell.

In step 614, the UE may switch from the source cell to the target cell based on the second configuration information.

The message may comprises: a request to perform timing advance acquisition for the at least one candidate cell.

The request may be a PDCCH order configured to cause the UE to transmit a preamble on a PRACH of the at least one candidate cell.

The UE may perform TA acquisition for the at least one candidate cell.

The message may comprise: a request to add at least one TCI state for the at least one candidate cell to a list of active TCI states.

The UE may add the at least one TCI to the list of active TCI states.

The request may be received in a MAC CE.

The UE may determine a delay to transmit on the target cell from the reception of the command to switch the UE from the source cell to the target cell, wherein the delay comprises a component accounting for decoding the second configuration information subsequent to the reception of the command set to zero. The UE may transmit, on the target cell, within the delay.

The UE may transmit data on a PUSCH of the target cell. The UE may transmit control on a PUCCH of the target cell. The UE may transmit a preamble on a PRACH of the target cell.

The delay may further comprises at least one of: a component accounting for transmitting, on the source cell, an acknowledgement of the reception of the command; a component accounting for applying the second configuration information for the target cell; a component accounting for acquiring timing information for the target cell; a component accounting for a margin after acquiring timing information for the target cell; a component accounting for waiting for a physical random access channel resource on the target cell; a component accounting for waiting for a physical uplink shared channel resource on the target cell; or a component accounting for waiting for a physical uplink control channel resource on the target cell.

The command may be received in a MAC CE.

Figure 7:
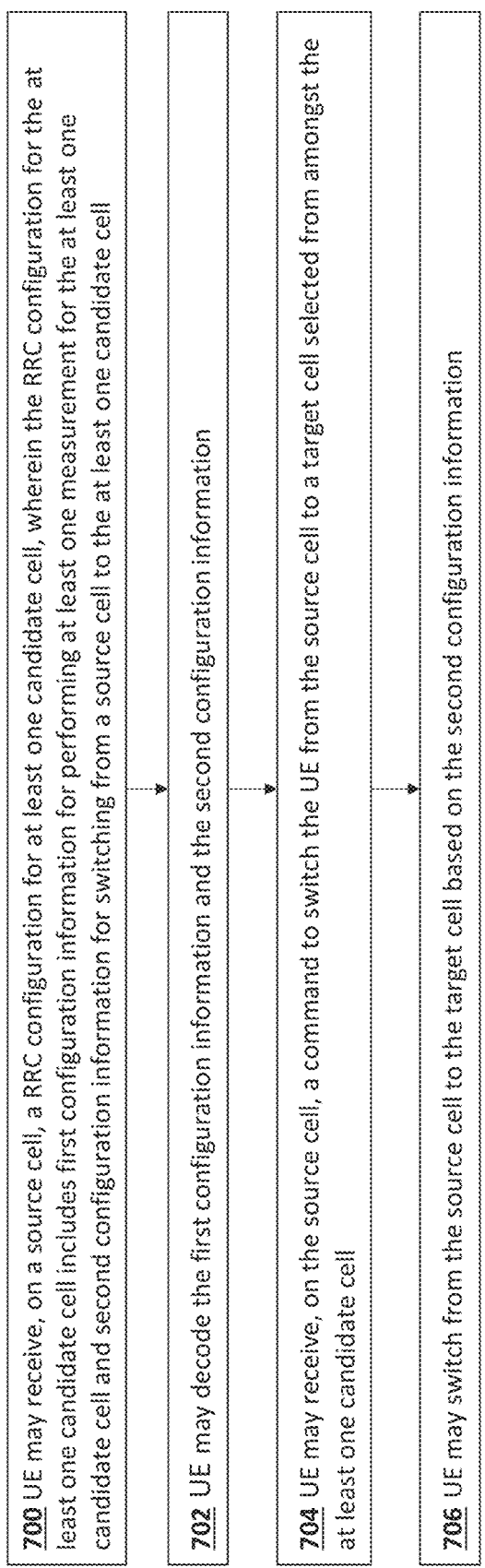
FIG. 7. shows a block diagram of a method for managing LTM in a 5G system performed by a user equipment.

FIG. 7. shows a block diagram of a method for managing LTM in a 5GS performed by a UE.

In step 700, the UE may receive, on a source cell, a RRC configuration for at least one candidate cell, wherein the RRC configuration for the at least one candidate cell includes first configuration information for performing at least one measurement for the at least one candidate cell and second configuration information for switching from a source cell to the at least one candidate cell.

In step 702, the UE may decode the first configuration information and the second configuration information.

In step 704, the UE may receive, on the source cell, a command to switch the apparatus from the source cell to a target cell selected from amongst the at least one candidate cell.

In step 706, the UE may switch from the source cell to the target cell based on the second configuration information.

The UE may decode the first configuration information and the second configuration information in response to receiving the RRC configuration for the at least one candidate cell. The UE may perform at least one measurement for the at least one candidate cell based on the first configuration information. The UE may transmit, on the source cell, a measurement report comprising at least one result of the at least one measurement for the at least one candidate cell.

The UE may decode the first configuration information in response to receiving the RRC configuration for the at least one candidate cell. The UE may perform at least one measurement for the at least one candidate cell based on the first configuration information. The UE may transmit, on the source cell, a measurement report comprising at least one result of the at least one measurement for the at least one candidate cell. The UE may decode the second configuration information in response to transmitting the measurement report.

The UE may decode the first configuration information in response to receiving the radio resource control configuration for the at least one candidate cell. The UE may perform at least one measurement for the at least one candidate cell based on the first configuration information. The UE may transmit, on the source cell, a measurement report comprising at least one result of the at least one measurement for the at least one candidate cell. The UE may receive, on the source cell, a message triggering the apparatus to decode the second configuration information. The UE may decode the second configuration information. The UE may receive, on the source cell, the command to switch the UE from the source cell to the target cell.

The message may comprise: a request to perform timing advance acquisition for the at least one candidate cell.

The request may be a PDCCH order configured to cause the UE to transmit a preamble on a PRACH of the at least one candidate cell.

The UE may perform TA acquisition for the at least one candidate cell.

The message may comprise: a request to add at least one TCI state for the at least one candidate cell to a list of active TCI states.

The UE may add the at least one TCI state for the at least one candidate cell to the list of active TCI states.

The request may be received in a MAC CE.

The command to switch the UE from the source cell to the target cell may be received in a MAC CE.

The UE may perform at least one measurement for the at least one candidate cell. The UE may transmit, on the source cell, a measurement report comprising at least one result of the at least one measurement for the at least one candidate cell.

The source cell and the at least one candidate cell may be served by a same base station. The source cell and the at least one candidate cell may be served by different base stations.

The UE may transmit data on a PUSCH of the target cell amongst the at least one cell. The UE may transmit control on a PUCCH of the target cell amongst the at least one cell. The UE may transmit a preamble on a PRACH of the target cell amongst the at least one cell.

FIG. 8 shows a schematic representation of a non-volatile memory medium storing instructions which when executed by a processor allow a processor to perform one or more of the steps of the methods of FIG. 6 and FIG. 7.

It is noted that whilst some embodiments have been described in relation to a 5GS, similar principles can be applied in relation to other communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one" is to be interpreted as "one or more".

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. Likewise, phrases such as "X and/or Y" or "X/Y" can be considered to cover either X or Y alone, or X and Y together.

Where it is said that a node or element (e.g. UE or gNB) "determines" information or the like, this may be considered to cover various ways in which that node becomes aware of or obtains that information. For example, determining may include performing one or more processing steps. Determining may also cover receiving the information, for example from another entity.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
   (a) hardware-only circuit implementations (such as implementations in only analog and/or digital circuitry) and
   (b) combinations of hardware circuits and software, such as (as applicable):
      (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM). The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples. Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory storing instructions that, when executed by the at least one processor, cause the apparatus at least to:
   receive, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell;
   decode the first configuration information;
   perform the at least one measurement for the at least one candidate cell based on the first configuration information;
   transmit, on the source cell, a measurement report comprising at least one result of the at least one measurement;
   receive, on the source cell, a message triggering the apparatus to decode the second configuration information;
   decode the second configuration information;
   receive, on the source cell, a command to switch the apparatus from the source cell to a target cell selected amongst the at least one candidate cell;
   switch from the source cell to the target cell based on the second configuration information;
   determine a delay to transmit on the target cell from the reception of the command to switch the apparatus from the source cell to the target cell, wherein the delay comprises a component accounting for decoding the second configuration information subsequent to the reception of the command set to zero; and
   transmit, on the target cell, within the delay.

2. The apparatus of claim 1, wherein the message comprises:
   a request to perform timing advance acquisition for the at least one candidate cell.

3. The apparatus of claim 2, wherein the request is a physical downlink control channel order configured to cause the apparatus to transmit a preamble on a physical random access channel of the at least one candidate cell.

4. The apparatus of claim 2, wherein the apparatus is further caused to:
   perform timing advance acquisition for the at least one candidate cell.

5. The apparatus of claim 1, wherein the message comprises:
a request to add at least one transmission configuration information state for the at least one candidate cell to a list of active transmission configuration information states.

6. The apparatus of claim 5, wherein the apparatus is further caused to:
add the at least one transmission configuration information state to the list of active transmission configuration information states.

7. The apparatus of claim 1, wherein the apparatus is further caused to:
transmit data on a physical uplink shared channel of the target cell;
transmit control on a physical uplink control channel of the target cell; or
transmit a preamble on a physical random access channel of the target cell.

8. The apparatus of claim 1, wherein the delay further comprises at least one of:
a component accounting for transmitting, on the source cell, an acknowledgement of the reception of the command;
a component accounting for applying the second configuration information for the target cell;
a component accounting for acquiring timing information for the target cell;
a component accounting for a margin after acquiring timing information for the target cell;
a component accounting for waiting for a physical random access channel resource on the target cell;
a component accounting for waiting for a physical uplink shared channel resource on the target cell; or
a component accounting for waiting for a physical uplink control channel resource on the target cell.

9. A method comprising:
receiving, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell;
decoding the first configuration information;
performing the at least one measurement for the at least one candidate cell based on the first configuration information;
transmitting, on the source cell, a measurement report comprising at least one result of the at least one measurement;
receiving, on the source cell, a message triggering the apparatus to decode the second configuration information;
decoding the second configuration information;
receiving, on the source cell, a command to switch the apparatus from the source cell to a target cell selected amongst the at least one candidate cell; and
switching from the source cell to the target cell based on the second configuration information;
determining a delay to transmit on the target cell from the reception of the command to switch the apparatus from the source cell to the target cell, wherein the delay comprises a component accounting for decoding the second configuration information subsequent to the reception of the command set to zero; and
transmitting, on the target cell, within the delay.

10. The method of claim 9, wherein the message comprises:
a request to perform timing advance acquisition for the at least one candidate cell.

11. The method of claim 10, wherein the request is a physical downlink control channel order configured to cause the apparatus to transmit a preamble on a physical random access channel of the at least one candidate cell.

12. The method of claim 9, comprising:
performing timing advance acquisition for the at least one candidate cell.

13. The method of claim 9, wherein the message comprises:
a request to add at least one transmission configuration information state for the at least one candidate cell to a list of active transmission configuration information states.

14. The method of claim 13, comprising:
adding the at least one transmission configuration information state to the list of active transmission configuration information states.

15. The method of claim 9, comprising:
transmitting data on a physical uplink shared channel of the target cell;
transmitting control on a physical uplink control channel of the target cell; or
transmitting a preamble on a physical random access channel of the target cell.

16. The method of claim 9, wherein the delay further comprises at least one of:
a component accounting for transmitting, on the source cell, an acknowledgement of the reception of the command;
a component accounting for applying the second configuration information for the target cell;
a component accounting for acquiring timing information for the target cell;
a component accounting for a margin after acquiring timing information for the target cell;
a component accounting for waiting for a physical random access channel resource on the target cell;
a component accounting for waiting for a physical uplink shared channel resource on the target cell; or
a component accounting for waiting for a physical uplink control channel resource on the target cell.

17. A non-transitory computer readable medium comprising program instructions that, when executed by an apparatus, cause the apparatus to perform at least:
receiving, on a source cell, a radio resource control configuration for at least one candidate cell, wherein the radio resource control configuration for the at least one candidate cell includes first configuration information for performing at least one measurement for the at least one candidate cell and second configuration information for switching from a source cell to the at least one candidate cell;
decoding the first configuration information;
performing the at least one measurement for the at least one candidate cell based on the first configuration information;
transmitting, on the source cell, a measurement report comprising at least one result of the at least one measurement;
receiving, on the source cell, a message triggering the apparatus to decode the second configuration information;

decoding the second configuration information;

receiving, on the source cell, a command to switch the apparatus from the source cell to a target cell selected amongst the at least one candidate cell;

switching from the source cell to the target cell based on the second configuration information;

determining a delay to transmit on the target cell from the reception of the command to switch the apparatus from the source cell to the target cell, wherein the delay comprises a component accounting for decoding the second configuration information subsequent to the reception of the command set to zero; and transmitting, on the target cell, within the delay.

18. The non-transitory computer readable medium of claim 17, wherein the message comprises:
a request to perform timing advance acquisition for the at least one candidate cell.

* * * * *